United States Patent
Goenka et al.

(12) 
(10) Patent No.: US 10,637,815 B2
(45) Date of Patent: Apr. 28, 2020

(54) DISPLAYING MESSAGING INTERFACES BASED UPON EMAIL CONVERSATIONS

(71) Applicant: Oath Inc., New York, NY (US)

(72) Inventors: Mohit Goenka, Santa Clara, CA (US); Ashish Khushal Dharamshi, Sunnyvale, CA (US); Nikita Varma, Milpitas, CA (US)

(73) Assignee: Oath Inc., New York, NY (US)

( * ) Notice: Subject to any disclaimer, the term of this patent is extended or adjusted under 35 U.S.C. 154(b) by 11 days.

(21) Appl. No.: 16/148,388

(22) Filed: Oct. 1, 2018

(65) Prior Publication Data

US 2020/0106731 A1 Apr. 2, 2020

(51) Int. Cl.
*H04L 12/58* (2006.01)
*H04L 29/08* (2006.01)
*G06F 3/0484* (2013.01)
*G06F 3/0482* (2013.01)

(52) U.S. Cl.
CPC ............ *H04L 51/16* (2013.01); *H04L 51/043* (2013.01); *H04L 51/046* (2013.01); *H04L 67/22* (2013.01); *H04L 67/306* (2013.01); *H04L 67/34* (2013.01); *H04L 67/36* (2013.01); *G06F 3/0482* (2013.01); *G06F 3/0484* (2013.01)

(58) Field of Classification Search
CPC ....... H04L 51/16; H04L 51/043; H04L 67/34; H04L 51/046; H04L 67/306; H04L 67/36; H04L 67/22; G06F 3/0482; G06F 3/0484
See application file for complete search history.

(56) References Cited

U.S. PATENT DOCUMENTS

| | | | | |
|---|---|---|---|---|
| 2002/0143885 A1* | 10/2002 | Ross, Jr. | ............... | G06Q 10/107 709/207 |
| 2009/0059922 A1* | 3/2009 | Appelman | .......... | H04L 12/1895 370/390 |
| 2015/0156153 A1* | 6/2015 | Deselaers | ............... | H04L 51/16 709/206 |
| 2015/0201061 A1* | 7/2015 | Toebes | .................... | H04M 3/44 379/93.17 |

* cited by examiner

*Primary Examiner* — Michael A Keller
(74) *Attorney, Agent, or Firm* — Cooper Legal Group, LLC

(57) ABSTRACT

One or more computing devices, systems, and/or methods for displaying messaging interfaces based upon email conversations are provided. For example, an email conversation associated with a plurality of user accounts may be identified. Email activity associated with the plurality of user accounts may be monitored. Based upon the email activity, it may be detected that a second plurality of user accounts of the plurality of user accounts are concurrently in an active state. A first device, associated with a first user account of the second plurality of user accounts, may display a first messaging interface comprising a first representation of the email conversation. A second device, associated with a second user account of the second plurality of user accounts, may display a second messaging interface comprising a second representation of the email conversation.

20 Claims, 13 Drawing Sheets

DISPLAYING MESSAGING INTERFACES BASED UPON EMAIL CONVERSATIONS

BACKGROUND

Many services, such as email services may allow a user to create an account for sending and receiving emails. For example, the user may be a part of a group of users that are involved in an email conversation (e.g., an email thread) associated with a subject. However, participating in the email conversation may become increasingly tedious as the number of participants and/or the volume of communications increases.

SUMMARY

In accordance with the present disclosure, one or more computing devices and/or methods are provided. In an example, an email conversation associated with a plurality of user accounts may be identified. Email activity associated with the plurality of user accounts may be monitored. Based upon the email activity, it may be detected that a second plurality of user accounts of the plurality of user accounts are concurrently in an active state. Responsive to detecting that the second plurality of user accounts are concurrently in the active state, a first graphical user interface of a first device, associated with a first user account of the second plurality of user accounts, may be controlled to display a first messaging interface comprising a representation of the messaging conversation. Alternatively and/or additionally, responsive to detecting that the second plurality of user accounts are concurrently in the active state, a second graphical user interface of a second device, associated with a second user account of the second plurality of user accounts, may be controlled to display a second messaging interface comprising a representation of the messaging conversation.

In an example, a conversation on a first online communication platform may be identified. The conversation may be associated with a plurality of user accounts. Communication activity associated with the plurality of user accounts may be monitored. Based upon the communication activity, it may be detected that the second plurality of user accounts of the plurality of user accounts are concurrently in an active state. Responsive to detecting that the second plurality of user accounts are concurrently in the active state, a first graphical user interface of a first device, associated with a first user account of the second plurality of user accounts, may be controlled to display a first online communication interface associated with a second online communication platform. Alternatively and/or additionally, responsive to detecting that the second plurality of user accounts are concurrently in the active state, a second graphical user interface of a second device, associated with a second user account of the second plurality of user accounts, may be controlled to display a second online communication interface associated with the second online communication platform

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
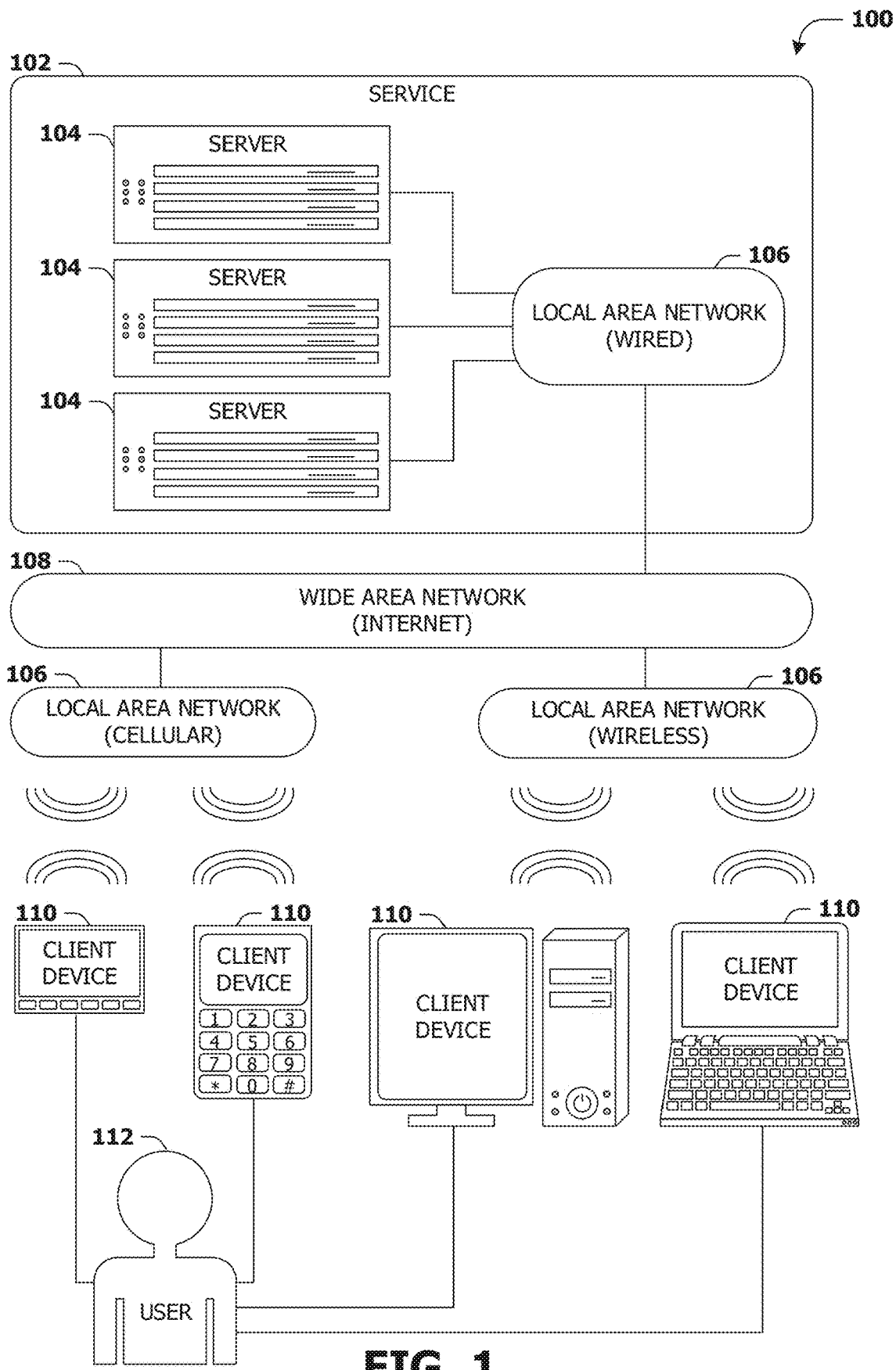
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
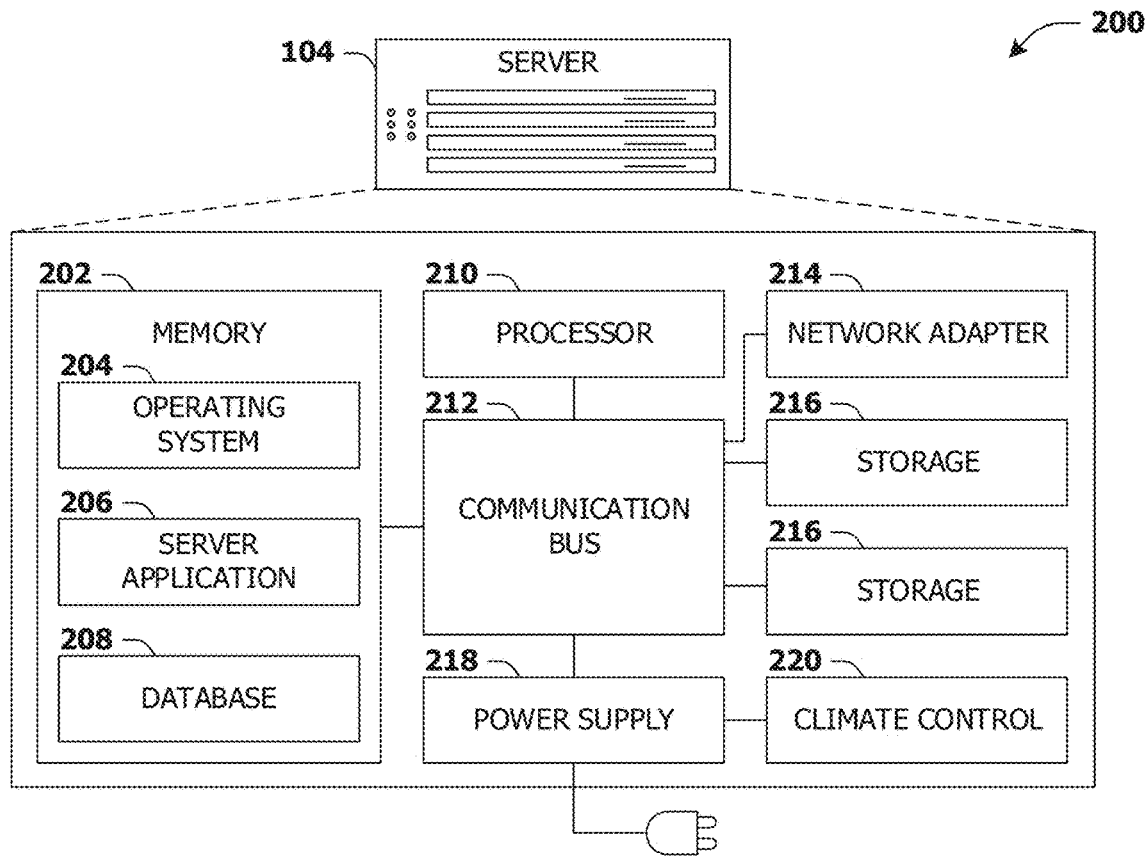
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
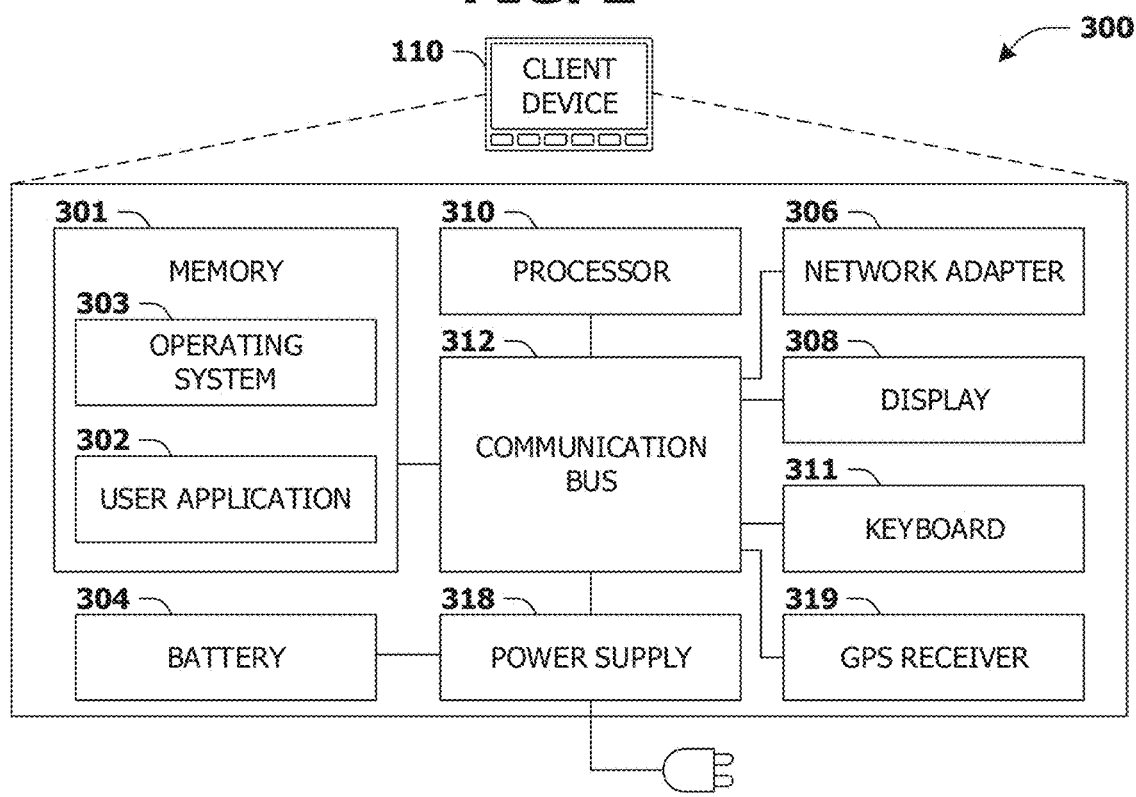
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for displaying messaging interfaces based upon email conversations are provided. For example, a user may access and/or interact with a service for sending and receiving emails and/or messages (e.g., such as an email service, a text messaging service, an instant message service, a social network, an application, etc.). An email account of the user with the service may be accessed and/or interacted with via one or more interfaces, such as an email interface. The user may be a part of a group of users that are involved in an email conversation (e.g., an email thread). For example, the email conversation may correspond to planning arrangements for an event, discussing details of a project, communicating about one or more topics, etc. However, it may become tedious for the group of users to perform communications via the email conversation (e.g., it may be difficult for users of the group of users to compose and/or transmit emails via email, it may take a substantial amount of time for users of the group of users to compose, transmit, receive and/or consume emails via email, it may not be user friendly to continue performing communications via email).

Thus, in accordance with one or more of the techniques presented herein, the email conversation may be identified and/or selected for presentation via messaging interfaces. Email activity associated with a plurality of user accounts (associated with the group of users) may be monitored to detect that a second plurality of user accounts of the plurality of user accounts are concurrently in an active state. Responsive to a determination that the second plurality of user accounts are concurrently in the active state, graphical user interfaces of devices associated with the second plurality of user accounts may be controlled to display messaging (e.g., instant messaging) interfaces comprising representations of the email conversation. For example, a first graphical user interface of a first device, associated with a first user account of the second plurality of user accounts, may be controlled to display a first messaging interface comprising a first representation of the email conversation, and a second graphical user interface of a second device, associated with a second user account of the second plurality of user accounts, may be controlled to display a second messaging interface comprising a second representation of the email conversation.

Figure 4A:
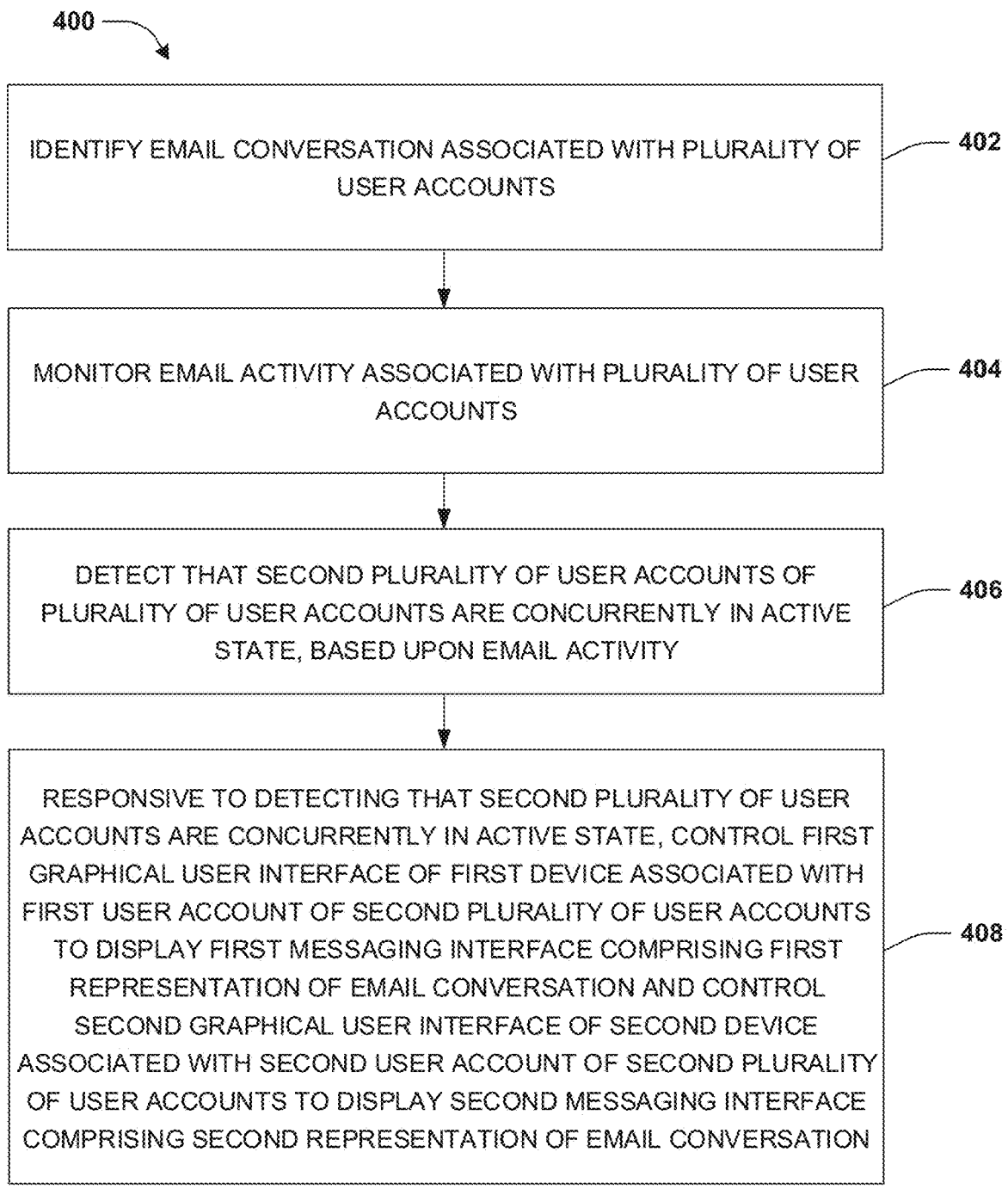
FIG. 4A is a flow chart illustrating an example method for displaying messaging interfaces based upon email conversations.

An embodiment of displaying messaging interfaces based upon email conversations is illustrated by an example method 400 of FIG. 4A. A first user, such as user Jill, (e.g., and/or a first client device associated with the first user) may access and/or interact with an email service for sending and receiving email messages. A first user account (e.g., an email account) of the first user with the email service may be accessed and/or interacted with via one or more interfaces on the first client device, such as an email client, a browser, an application, etc. For example, a plurality of emails associated with the first user account of the first user may be accessed using a first email interface of the first client device.

In some examples, the plurality of emails may comprise a first set of emails associated with an email conversation. For example, the email conversation and/or the first set of emails may be associated with a plurality of user accounts (e.g., a plurality of email accounts), comprising the first user account. For example, the plurality of user accounts may correspond to a group of users associated with the email conversation. Each user account of the plurality of user accounts may correspond to a user of the group of users. Each user account of the plurality of user accounts may correspond to a recipient of one or more emails of the first set of emails. Alternatively and/or additionally, each user account of the plurality of user accounts may correspond to a sender of one or more emails of the first set of emails. In some examples, the first set of emails may be associated with a subject (e.g., a common subject line associated with each email of the first set of emails).

In an example, the first user account may transmit a first email, of the first set of emails, to one or more user accounts. For example, the first user account may be a sender of the first email and/or the one or more user accounts may be recipients of the first email. The first email may comprise a first message body and/or the subject. The subject and/or the first message body may be associated with planning a meeting, planning arrangements for an event, discussing details of a project, communicating about one or more topics, etc. In some examples, a second user account of the plurality of user accounts may respond (e.g., reply) to the first email by transmitting a second email (e.g., a response email, a reply email) to one or more second user accounts. The one or more second user accounts may comprise the first user account, the one or more user accounts and/or one or more third user accounts (e.g., the one or more third user accounts may be added to the email conversation as recipients of the second email). Alternatively and/or additionally, the email conversation may comprise the first email and/or the second email. In some examples, the plurality of user accounts associated with the email conversation may comprise the one or more second user accounts and/or the first user account.

At 402, the email conversation may be identified. In some examples, the email conversation may be selected for presentation via messaging interfaces. For example, the email conversation may be selected for presentation via messaging interfaces based upon a number of user accounts of the plurality of user accounts associated with the email conversation. For example, the email conversation may be selected for presentation via messaging interfaces responsive to a determination that the plurality of user accounts comprises more than a minimum number of user accounts (e.g., more than one user account, more than two user accounts, etc.). Alternatively and/or additionally, the email conversation may be selected for presentation via messaging interfaces responsive to a determination that the plurality of user accounts comprises less than a maximum number of user accounts (e.g., less than 50 user accounts, less than 100 user accounts, etc.).

Alternatively and/or additionally, the email conversation may be selected for presentation via messaging interfaces based upon a determination that the plurality of user accounts are associated with an (single) email provider. For example, each user account of the plurality of user accounts may be associated with the email provider. Alternatively and/or additionally, the plurality of user accounts may be associated with a plurality of email providers. Alternatively and/or additionally, the email conversation may be selected for presentation via messaging interfaces based upon a determination that two or more user accounts of the plurality of user accounts are associated with the email provider.

Alternatively and/or additionally, the email conversation may be selected for presentation via messaging interfaces based upon a determination that each user account of the plurality of user accounts is associated with a (single) messaging platform. For example, each user account of the plurality of user accounts may be used as a messaging user account for the messaging platform. Alternatively and/or additionally, each user account of the plurality of user accounts may be linked with a messaging user account, different than the user account, associated with the messaging platform. Alternatively and/or additionally, the email conversation may be selected for presentation via messaging interfaces based upon a determination that two or more user accounts of the plurality of user accounts are associated with the messaging platform.

Alternatively and/or additionally, the email conversation may be selected for presentation via messaging interfaces based upon locations associated with second plurality of user accounts. For example, a location associated with each user account of the plurality of user accounts may be determined based upon locations of client devices of the plurality of user accounts. For example, the email conversation may be selected for presentation via messaging interfaces responsive to a determination that distances between the locations are less than a maximum threshold distance. Alternatively and/or additionally, the email conversation may be selected for presentation via messaging interfaces responsive to a determination that the distances between the locations are greater than a minimum threshold distance.

Alternatively and/or additionally, the email conversation may be selected for presentation via messaging interfaces based upon types of devices associated with the plurality of client devices. For example, a first type of device may correspond to computers that may enable a user to (conveniently) perform communications using a messaging interface (e.g., desktop computers, laptop computers, home theatre personal computer, large tablets, large smartphones, computers with screens larger than a threshold size, etc.). Alternatively and/or additionally, a second type of device may correspond to computers that may be difficult for a user to use to perform communications using a messaging interface (e.g., small smartphones, small tablets, computers with screens smaller than the threshold size, etc.). For example, the email conversation may be selected for presentation via messaging interfaces based upon a determination that a number of devices of the plurality of client devices that are the first type of device is greater than a threshold number of devices and/or that a number of devices of the plurality of client devices that are the second type of device is less than a threshold number of devices. It may be appreciated that a threshold number of devices may be determined based upon a threshold proportion of devices.

Alternatively and/or additionally, the email conversation may be selected for presentation via messaging interfaces based upon content of the email conversation. For example, the content of the email conversation may comprise one or more images, one or more videos, one or more files, one or more documents and/or one or more sets of text, wherein each set of text of the one or more set of text may correspond to an email of the first set of emails (of the email conversation). For example, the content of the email conversation may be analyzed to determine subject matter associated with the email conversation. For example, the email conversation may be selected for presentation via messaging interfaces based upon a determination that the subject matter is associated with a first type of subject matter (e.g., business, social, news, etc.). Alternatively and/or additionally, the email conversation may not be selected for presentation via messaging interfaces based upon a determination that the subject matter is associated with a second type of subject matter.

Alternatively and/or additionally, the email conversation may be selected for presentation via messaging interfaces based upon relationships associated with the plurality of user accounts. For example, the email conversation may be selected for presentation via messaging interfaces responsive to a determination that the group of users associated with the plurality of user accounts have a first type of relationship with each other (e.g., business relationship, social relationship, etc.). Alternatively and/or additionally, the email conversation may not be selected for presentation via messaging interfaces responsive to a determination that the group of users have a second type of relationship with each other.

Alternatively and/or additionally, the email conversation may be selected for presentation via messaging interfaces based upon an amount of communication associated with the plurality of user accounts. For example, the amount of communication may be determined based upon a number of communications (e.g., emails, messages, etc.) between the plurality of user accounts. Alternatively and/or additionally, the amount of communication may be determined based upon a frequency of communications (e.g., a number of communications per day, a number of communications per week, etc.) between the plurality of user accounts. Alternatively and/or additionally, the amount of communication may be determined based upon lengths of communications (e.g., number of characters in emails and/or messages) between the plurality of user accounts. For example, the email conversation may be selected for presentation via messaging interfaces responsive to a determination that the amount of communication is greater than a threshold amount of communication. Alternatively and/or additionally, the email conversation may not be selected for presentation via messaging interfaces responsive to a determination that the amount of communication is less than the threshold amount of communication.

In some examples, the messaging platform and the email provider may be associated with a (single) service. Alternatively and/or additionally, the messaging platform and the email provider may be associated with different services.

At 404, email activity associated with the plurality of user accounts may be monitored. For example, the email activity may comprise instances that an email interface associated with a user account of the plurality of user accounts is opened, open and/or closed. For example, an instance that an email interface is opened may be detected (e.g., based upon reception of login information). Alternatively and/or additionally, an instance that an email interface is open may be detected (e.g., by detecting that a browser window of a client device is presenting the email interface, by detecting that the email interface is being presented on the client device, by detecting that the client device is performing operations associated with the email interface, etc.). Alternatively and/or additionally, an instance that an email interface is closed may be detected (e.g., by detecting that a browser window associated with the email interface is closed, by detecting that the email interface is not performing operations on the client device, etc.).

Alternatively and/or additionally, the email activity may comprise interactions associated with email interfaces associated with the plurality of user accounts. Indications of the interactions may be received from a plurality of client devices associated with the plurality of user accounts. For example, the interactions may comprise a selection of a selectable input associated with the email interfaces, a selection of an email associated with the email interfaces, etc. For example, one or more selectable inputs (e.g., "Inbox", "Compose", "Settings", etc.) may be selected via one or more client devices of the plurality of client devices. Alternatively and/or additionally, one or more emails may be selected via one or more client devices of the plurality of client devices. Alternatively and/or additionally, the interactions may comprise an instance that an email is presented. For example, one or more emails may be presented by being displayed by one or more client devices of the plurality of client devices.

Alternatively and/or additionally, the interactions may comprise an instance that the email conversation is presented. For example, one or more emails of the email conversation may be displayed by one or more client devices of the plurality of client devices. Alternatively and/or additionally, the interactions may comprise one or more emails associated with the email conversation being transmitted by one or more client devices of the plurality of client devices (e.g., one or more emails having the subject associated with the email conversation may be transmitted to one or more user accounts of the plurality of user accounts, etc.)

Alternatively and/or additionally, the email activity may comprise email connectivity associated with the plurality of user accounts. For example, the email connectivity may be determined based upon detecting whether emails are received and/or downloaded by client devices of the plurality of client devices.

At 406, it may be detected that a second plurality of user accounts, of the plurality of user accounts, are concurrently in an active state, based upon the email activity. For example, a user account of the second plurality of user accounts may be determined to be in the active state based upon a determination that an email interface associated with the user account is open. Alternatively and/or additionally, a user account of the second plurality of user accounts may be determined to be in the active state based upon detection of one or more interactions with an email interface associated with the user account. Alternatively and/or additionally, a user account of the second plurality of user accounts may be determined to be in the active state based upon a determination that a client device associated with the user account received and/or downloaded one or more emails transmitted to the user account.

Alternatively and/or additionally, a user account of the second plurality of user accounts may be determined to be in the active state based upon a determination of a plurality of conditions. The plurality of conditions may comprise a first condition that an email interface associated with the user account is open, a second condition that one or more interactions with the email interface is detected, a third condition that a client device associated with the user account received and/or downloaded one or more emails transmitted to the user account, a fourth condition that the email conversation is presented by the client device, and/or a fifth condition that one or more emails associated with the email conversation are transmitted by the client device, etc.

For example, a user account of the second plurality of user accounts may be determined to be in the active state based upon a determination of at least a single condition of the plurality of conditions. Alternatively and/or additionally, a user account of the second plurality of user accounts may be determined to be in the active state based upon a determination of two (e.g., or some other threshold number) or more of the plurality of conditions. Alternatively and/or additionally, a user account of the second plurality of user accounts may be determined to be in the active state based upon a determination of most of the plurality of conditions. Alternatively and/or additionally, a user account of the second plurality of user accounts may be determined to be in the active state based upon a determination of every condition of the plurality of conditions.

In some examples, it may be determined that the second plurality of user accounts are concurrently in the active state based upon determining that the second plurality of user accounts are in the active state within a period of time. For example, the period of time may be 1 minute, 15 minutes, 30 minutes, etc. For example, it may be determined that the second plurality of user accounts are in the active state within the period of time based upon a determination that the email activity was performed using a second plurality of client devices associated with the second plurality of user accounts within the period of time.

In some examples, the email activity may be indicative of each user account of the plurality of user accounts being in the active state. Accordingly, the second plurality of user accounts may comprise each user account of the plurality of user accounts. Alternatively and/or additionally, the email activity may be indicative of one or more fourth user accounts of the plurality of user accounts being in an inactive state. Accordingly, the second plurality of user accounts may not comprise the one or more fourth user accounts.

At 408, responsive to detecting that the second plurality of user accounts are concurrently in the active state, representations of the email conversation may be presented using a plurality of messaging interfaces. For example, a second graphical user interface of a second client device, associated with a third user account of the second plurality of user accounts, may be controlled to display a first messaging interface comprising a first representation of the email conversation. Alternatively and/or additionally, a third graphical user interface of a third client device, associated with a fourth user account of the second plurality of user accounts, may be controlled to display a second messaging interface comprising a second representation of the email conversation.

In some examples, the representations of the email conversation may be presented using the plurality of messaging interfaces based upon a number of user accounts of the second plurality of user accounts (that are in the active state). For example, the representations of the email conversation may be presented using the plurality of messaging interfaces responsive to a determination that the number of user accounts of the second plurality of user accounts is greater than a threshold number of user accounts (e.g., 2 users, 3 users, 5 users, 10 users, etc.). Alternatively and/or additionally, the threshold number of user accounts may be determined based upon a threshold proportion of user accounts. For example, the threshold proportion of user accounts may be 10% of the plurality of user accounts, 20% of the plurality of user accounts, 40% of the plurality of user accounts, 50% of the plurality of user accounts, 60% of the plurality of user accounts, etc.

In an example, the plurality of user accounts may comprise 60 user accounts. The threshold proportion of user accounts may be 30% of the plurality of user accounts. Accordingly, the threshold number of user accounts may be 18 user accounts. Thus, in an instance where the number of user accounts of the second plurality of user accounts (that are in the active state) is 15 user accounts (and/or a different number less than or equal to 18), the representations of the email conversation may not be presented using the plurality of messaging interfaces. Alternatively and/or additionally, in an instance where the number of user accounts of the second plurality of user accounts (that are in the active state) is 20 user accounts (and/or a different number greater than 18), the representations of the email conversation may be presented using the plurality of messaging interfaces.

In some examples, the representations of the email conversation may be presented using the plurality of messaging interfaces responsive to receiving a plurality of requests from client devices associated with the second plurality of user accounts. For example, notifications indicative of the second plurality of user accounts being in the active state may be transmitted to the second plurality of client devices (associated with the second plurality of user accounts). For example, each notification of the notifications may comprise an indication of the number of user accounts of the second plurality of user accounts that are in the active state. Alternatively and/or additionally, each notification of the notifications may comprise an indication of usernames associated with the second plurality of user accounts. Alternatively and/or additionally, each notification of the notifications may comprise an indication of the email conversation (e.g., the subject associated with the first set of emails).

In some examples, the plurality of requests, indicative of presenting the representations of the email conversation using the plurality of messaging interfaces, may be received via the notifications. For example, each notification of the notifications may comprise a second selectable input corresponding to a request to present the email conversation using a messaging interface. In some examples, the email conversation may be presented using the plurality of messaging interfaces responsive to a determination that a number of requests of the plurality of requests is greater than a threshold number of requests. Alternatively and/or additionally, the email conversation may be presented using the plurality of messaging interfaces automatically (without receiving the plurality of requests).

In some examples, a messaging conversation may be generated based upon the email conversation. For example, the representations of the email conversation may comprise the messaging conversation. For example, the messaging conversation may comprise the content of the email conversation. In some examples, the email conversation may be formatted based upon a messaging format to generate the messaging conversation. For example, the messaging conversation may comprise a plurality of sets of content. For example, each set of content of the plurality of sets of content may comprise an image of the one or more images of the email conversation, a video of the one or more videos of the email conversation, a file of the one or more files of the email conversation, a document of the one or more documents of the email conversation and/or a set of text of the one or more sets of text of the email conversation.

In some examples, the messaging conversation may comprise a plurality of user account indications. For example, the plurality of user account indications may indicate user accounts associated with the plurality of sets of content. For example, the plurality of user account indications may indicate a user account (e.g., a sender) that transmitted each set of content of the plurality of sets of content. For example, each user account indication of the plurality of user account indications may be positioned adjacent to (e.g., below, beside, above, etc.) a set of content of the plurality of sets of content.

In some examples, it may be determined that a fourth client device, associated with a fifth user account of the second plurality of user accounts, does not have messaging software installed for enabling a third messaging interface (to be used and/or displayed). Alternatively and/or additionally, it may be determined that the fifth user account is not linked with a messaging account of the messaging platform. A first notification may be transmitted to the fourth client device. For example, the first notification may comprise an indication of the messaging software and/or setting up a messaging account. Alternatively and/or additionally, the first notification may comprise an indication of a second number of user accounts of the second plurality of user accounts that are associated with a client device that are capable of using messaging interfaces.

In some examples, the first notification may comprise a third selectable input corresponding to a first request to download and/or install the messaging software. For example, the first request to download and/or install the messaging software may be received from the fourth client device (responsive to a selection of the third selectable input). The messaging software may be transmitted to the fourth client device (responsive to receiving the first request). For example, the messaging software may be downloaded to the fourth client device and/or may be installed on the fourth client device. A fourth graphical user interface of the fourth client device may be controlled to display the third messaging interface comprising a third representation of the email conversation.

Alternatively and/or additionally, the first notification may comprise a fourth selectable input corresponding to a second request to set up a messaging account for the messaging platform. For example, the second request to set up the messaging account for the messaging platform may be received from the fourth client device (responsive to a selection of the fourth selectable input). One or more user information fields may be presented using the fourth client device. User information associated with the fourth user account may be entered and/or received via the one or more user information fields. The messaging account associated with the fifth user account may be generated. The fourth graphical user interface of the fourth client device may be controlled to display the third messaging interface comprising the third representation of the email conversation.

In some examples, communications may be performed using the plurality of messaging interfaces. In some examples, a plurality of messages may be received from one or more user accounts of the second plurality of user accounts via one or more messaging interfaces of the plurality of messaging interfaces. Each message of the plurality of messages may comprise an image, a video, a file, a document and/or a set of text. In some examples, representations of the plurality of messages may be displayed using the plurality of messaging interfaces. In some examples, one or more emails may be generated based upon the plurality of messages. For example, the one or more emails may comprise content associated with the plurality of messages. In some examples, the one or more emails may be transmitted to the plurality of user accounts. Alternatively and/or additionally, the one or more emails may be transmitted to merely one or more third user accounts, of the plurality of user accounts, that are not associated with the plurality of messaging interfaces. For example, the one or more third user accounts may be associated with one or more second client devices that are not used to present a messaging interface comprising a representation of the email conversation.

For example, responsive to receiving the plurality of messages, the email conversation may be updated and/or modified to include a second plurality of emails associated with the plurality of messages. For example, each email of the second plurality of emails may comprise a message of the plurality of messages. Alternatively and/or additionally, each email of the second plurality of emails may comprise an indication of a sender of a message of the plurality of messages. In some examples, each email of the second plurality of emails, comprising a message of the plurality of messages, may be transmitted to the plurality of user accounts and/or the one or more third user accounts responsive to receiving the message via the plurality of messaging interfaces. In some examples, the second plurality of emails may be transmitted responsive to receiving a fourth request corresponding to transmitting emails associated with the plurality of messages.

Alternatively and/or additionally, merely a single email, comprising the plurality of messages, may be transmitted to the plurality of user accounts and/or the one or more third user accounts. For example, the single email may comprise the plurality of messages and/or indications of senders of each message of the plurality of messages. In some examples, the single email may be generated and/or transmitted responsive to receiving a fifth request, to transmit the single email, from one or more client devices. Alternatively and/or additionally, the single email may be generated and/or transmitted responsive to determining that users are no longer communicating using the plurality of messaging interfaces (e.g., each messaging interface of the plurality of messaging interfaces may be closed, messaging activity may not be detected for a threshold period of time, messages may not be received for the threshold period of time, etc.).

For example, messaging activity associated with the plurality of messaging interfaces may be monitored. It may be detected that one or more first messaging interfaces of the plurality of messaging interfaces may be closed. Alternatively and/or additionally, it may be detected that one or more second messaging interfaces of the plurality of messaging interfaces may not be interacted with. Thus, by monitoring the messaging activity, it may be determined that a second plurality of messaging interfaces of the plurality of messaging interfaces are being used (e.g., that the second plurality of messaging interfaces are not closed and/or that the second plurality of messaging interfaces are being interacted with).

In some examples, responsive to a determination that a number of active messaging interfaces of the second plurality of messaging interfaces is less than a threshold number of messaging interfaces, the second plurality of emails and/or the single email may be transmitted to the plurality of user accounts. Alternatively and/or additionally, responsive to the determination that the number of active messaging interfaces of the second plurality of messaging interfaces is less than the threshold number of messaging interfaces, the second plurality of messaging interfaces may (automatically) be closed. Alternatively and/or additionally, responsive to the determination that the number of active messaging interfaces of the second plurality of messaging interfaces is less than the threshold number of messaging interfaces, a second plurality of email interfaces may be (automatically) be opened, in place of the second plurality of messaging interfaces. For example, the second plurality of email interfaces may (automatically) be navigated to the email conversation (e.g., the email conversation may comprise the single email and/or the second plurality of emails comprising representations of the plurality of messages transmitted via the plurality of messaging interfaces).

Alternatively and/or additionally, responsive to the determination that the number of active messaging interfaces of the second plurality of messaging interfaces is less than the threshold number of messaging interfaces, second notifications may be transmitted to each client device of a third plurality of client devices associated with the second plurality of messaging interfaces. For example, each notification of the second notifications may be indicative of the number of active messaging interfaces of the second plurality of messaging interfaces. Alternatively and/or additionally, each notification of the second notifications may be indicative of the number of active messaging interfaces of the second plurality of messaging interfaces being less than the threshold number of messaging interfaces.

In some examples, each notification of the second notifications may comprise a fifth selectable input corresponding to a request to resume communication using a messaging interface. For example, responsive to a selection of the fifth selectable input, a messaging interface on a client device may not be closed. Alternatively and/or additionally, each notification of the second notifications may comprise a sixth selectable input corresponding to a request to resume communication using an email interface. For example, responsive to a selection of the sixth selectable input, a messaging interface on a client device may be closed and/or an email interface may be opened in place of the messaging interface.

In some examples, the threshold number of messaging interfaces may be determined based upon a threshold proportion of messaging interfaces. For example, the threshold proportion of messaging interfaces may be 10% of the plurality of messaging interfaces, 20% of the plurality of messaging interfaces, 40% of the plurality of messaging interfaces, 50% of the plurality of messaging interfaces, 60% of the plurality of messaging interfaces, etc. Alternatively and/or additionally, the threshold number of messaging interfaces may be associated with the threshold number of user accounts (e.g., the threshold number of messaging interfaces may be equal to the threshold number of user accounts). Alternatively and/or additionally, the threshold number of messaging interfaces may not be associated with the threshold number of user accounts (e.g., the threshold number of messaging interfaces may not be equal to the threshold number of user accounts).

Figure 4B:
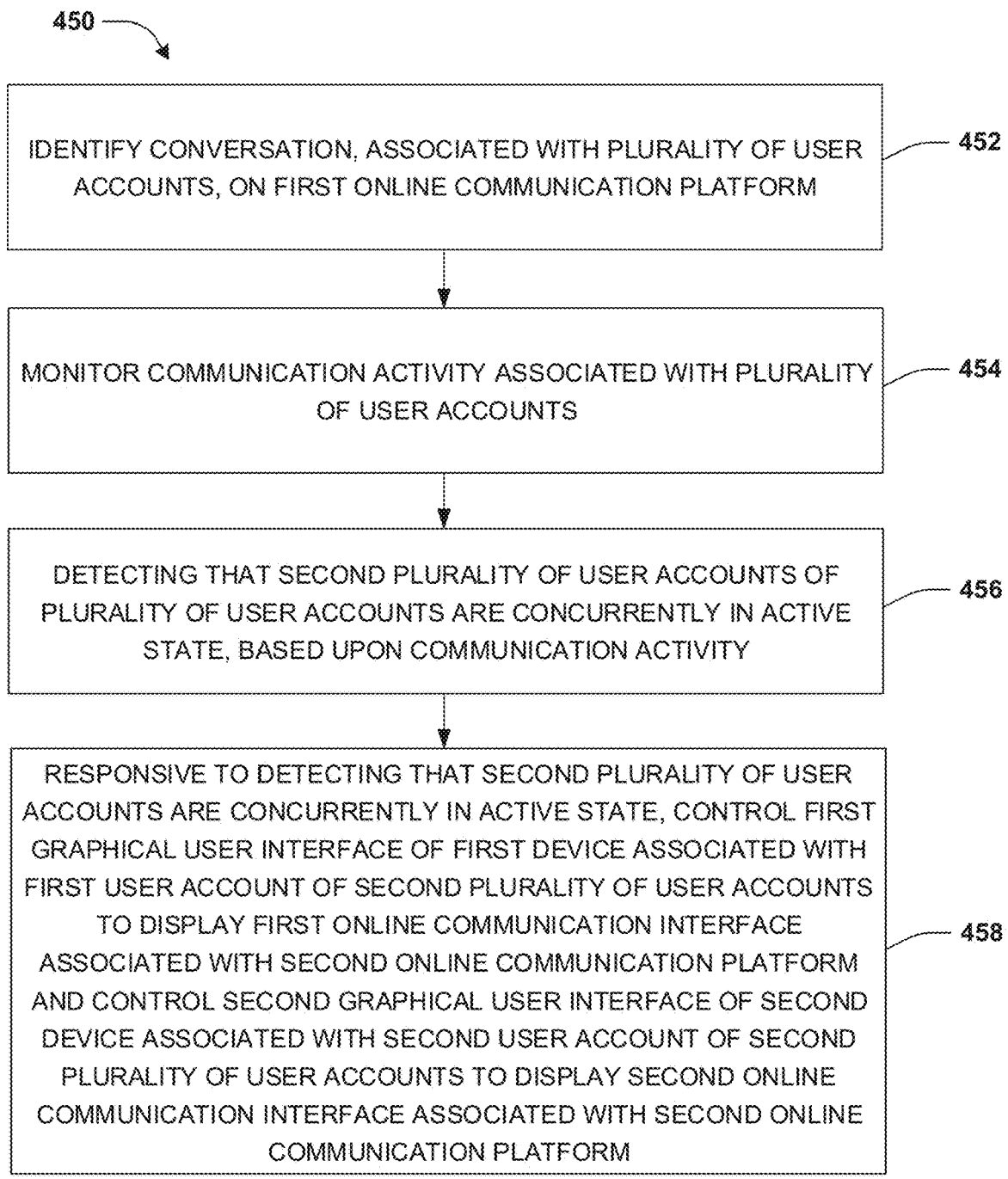
FIG. 4B is a flow chart illustrating an example method for displaying online communication interfaces associated with a second online communication platform based upon conversations on a first online communication platform.

An embodiment of displaying online communication interfaces associated with a second online communication platform based upon conversations on a first online communication platform is illustrated by an example method 450 of FIG. 4B. A first user, such as user James, (e.g., and/or a first client device associated with the first user) may access and/or interact with the first online communication platform (e.g., an email platform, a messaging platform, a social network platform, a social network messaging platform, a gaming platform comprising a gaming communication interface for performing communications between gaming users, etc.).

At 452, a first conversation on the first online communication platform may be identified. For example, the first conversation may be associated with a plurality of user accounts. In some examples, the first online communication platform may be associated with one or more email services. For example, the first conversation may be an email conversation. Alternatively and/or additionally, the first online communication platform may be associated with a messaging platform. For example, the first conversation may be a messaging conversation between a group of users associated with the plurality of user accounts. In some examples, the first online communication platform may be associated with the gaming platform, wherein the group of users may perform communications while playing one or more games. Alternatively and/or additionally, the first online communication platform may be associated with a different type of communication platform.

In some examples, the first conversation may be selected for presentation via the second online communication platform. For example, the first conversation may be selected for presentation via the second online communication platform based upon a number of user accounts of the plurality of user accounts associated with the first conversation. For example, the first conversation may be selected for presentation via the second online communication platform responsive to a determination that the plurality of user accounts comprises more than a minimum number of user accounts (e.g., more than one user account, more than two user accounts, etc.). Alternatively and/or additionally, the first conversation may be selected for presentation via the second online communication platform responsive to a determination that the plurality of user accounts comprises less than a maximum number of user accounts (e.g., less than 50 user accounts, less than 100 user accounts, etc.).

Alternatively and/or additionally, the first conversation may be selected for presentation via the second online communication platform based upon a determination that each user account of the plurality of user accounts is associated with the second online communication platform. For example, each user account of the plurality of user accounts may be used as a communication user account for the second online communication platform. Alternatively and/or additionally, each user account of the plurality of user accounts may be linked with a communication user account, different than the user account, associated with the second online communication platform. Alternatively and/or additionally, the first conversation may be selected for presentation via the second online communication platform based upon a determination that two or more user accounts of the plurality of user accounts are associated with the second online communication platform.

Alternatively and/or additionally, the first conversation may be selected for presentation via the second online communication platform based upon locations associated with second plurality of user accounts. For example, a location associated with each user account of the plurality of user accounts may be determined based upon locations of client devices of the plurality of user accounts. For example, the first conversation may be selected for presentation via the second online communication platform responsive to a determination that distances between the locations are less than a maximum threshold distance. Alternatively and/or additionally, the first conversation may be selected for presentation via the second online communication platform responsive to a determination that the distances between the locations are greater than a minimum threshold distance.

Alternatively and/or additionally, the first conversation may be selected for presentation via the second online communication platform based upon types of devices associated with the plurality of client devices. For example, a first type of device may correspond to computers that may enable a user to (conveniently) perform communications using the second online communication platform (e.g., computers with microphones to accommodate audio calling, computers with cameras to accommodate video calling, computers with sufficient processing power to accommodate an augmented reality (AR) communication experience, computers capable of enabling a virtual reality (VR) communication experience such as VR headsets, computers capable of enabling a mixed reality (MR) communication experience, etc.). Alternatively and/or additionally, a second type of device may correspond to computers that may be difficult for a user to use to perform communications using the second online communication platform (e.g., computers without microphones, computers without cameras, computers with insufficient processing power to accommodate the AR communication experience, computers incapable of enabling the VR communication experience, computers incapable of enabling the MR communication experience, etc.). For example, the first conversation may be selected for presentation via the second online communication platform based upon a determination that a number of devices of the plurality of client devices that are the first type of device is greater than a threshold number of devices and/or that a number of devices of the plurality of client devices that are the second type of device is less than a threshold number of devices. It may be appreciated that a threshold number of devices may be determined based upon a threshold proportion of devices.

Alternatively and/or additionally, the first conversation may be selected for presentation via the second online communication platform based upon relationships associated with the plurality of user accounts. For example, the first conversation may be selected for presentation via the second online communication platform responsive to a determination that a group of users associated with the plurality of user accounts have a first type of relationship with each other (e.g., business relationship, social relationship, etc.). Alternatively and/or additionally, the first conversation may not be selected for presentation via the second online communication platform responsive to a determination that the group of users have a second type of relationship with each other.

Alternatively and/or additionally, the first conversation may be selected for presentation via the second online communication platform based upon an amount of communication associated with the plurality of user accounts. For example, the amount of communication may be determined based upon a number of communications (e.g., emails, messages, phone calls, calls using an online communication platform, video calls, etc.) between the plurality of user accounts. Alternatively and/or additionally, the amount of communication may be determined based upon a frequency of communications (e.g., a number of communications per day, a number of communications per week, etc.) between the plurality of user accounts. Alternatively and/or additionally, the amount of communication may be determined based upon lengths of communications (e.g., number of characters in emails and/or messages, lengths of time associated with phone calls, calls using the online communication platform and/or video calls, etc.) between the plurality of user accounts. For example, the first conversation may be selected for presentation via the second online communication platform responsive to a determination that the amount of communication is greater than a threshold amount of communication. Alternatively and/or additionally, the first conversation may not be selected for presentation via the second online communication platform responsive to a determination that the amount of communication is less than the threshold amount of communication.

In some examples, the first online communication platform and the second online communication platform may be associated with a (single) service. For example, the service may enable users to perform a first type of communication using the first online communication platform and/or the service may enable users to perform a second type of communication using the second online communication platform. Alternatively and/or additionally, the first online communication platform and the second online communication platform may be associated with different services.

At 454, communication activity associated with the plurality of user accounts may be monitored. For example, the communication activity may comprise instances that a communication interface of the first communication platform associated with a user account of the plurality of user accounts is opened, open and/or closed. For example, an instance that a communication interface is opened may be detected (e.g., based upon reception of login information). Alternatively and/or additionally, an instance that a communication interface is open may be detected (e.g., by detecting that a browser window of a client device is presenting the communication interface, by detecting that the communication interface is being presented on the client device, by detecting that the client device is performing operations associated with the communication interface, etc.). Alternatively and/or additionally, an instance that a communication interface is closed may be detected (e.g., by detecting that a browser window associated with the communication interface is closed, by detecting that the communication interface is not performing operations on the client device, etc.).

Alternatively and/or additionally, the communication activity may comprise interactions associated with communication interfaces of the first communication platform associated with the plurality of user accounts. Indications of the interactions may be received from a plurality of client devices associated with the plurality of user accounts. For example, the interactions may comprise a selection of a selectable input associated with the communication interfaces. Alternatively and/or additionally, the interactions may comprise an instance that one or more communications are transmitted and/or received. Alternatively and/or additionally, the interactions may comprise an instance that the first conversation is presented. For example, one or more messages associated with the first conversation may be displayed by one or more client devices of the plurality of client devices using the first communication platform. Alternatively and/or additionally, the interactions may comprise one or more audio calls and/or video calls performed by one or more client devices of the plurality of client devices using the first communication platform. Alternatively and/or additionally, the interactions may comprise one or more other types of communications performed by one or more client devices of the plurality of client devices using the first communication platform.

At 456, it may be detected that a second plurality of user accounts, of the plurality of user accounts, are concurrently in an active state, based upon the communication activity. For example, a user account of the second plurality of user accounts may be determined to be in the active state based upon a determination that a communication interface (of the first online communication platform) associated with the user account is open. Alternatively and/or additionally, a user account of the second plurality of user accounts may be determined to be in the active state based upon detection of one or more interactions with a communication interface (of the first online communication platform) associated with the user account. Alternatively and/or additionally, a user account of the second plurality of user accounts may be determined to be in the active state based upon a determination that a client device associated with the user account received and/or downloaded one or more communications transmitted to the user account.

Alternatively and/or additionally, a user account of the second plurality of user accounts may be determined to be in the active state based upon a determination of a plurality of conditions. The plurality of conditions may comprise a first condition that a communication interface (of the first online communication platform) associated with the user account is open, a second condition that one or more interactions with the communication interface is detected, a third condition that a client device associated with the user account received and/or downloaded one or more communications transmitted to the user account, a fourth condition that the first conversation is presented by the client device, and/or a fifth condition that one or more communications associated with the first conversation are transmitted by the client device, etc.

For example, a user account of the second plurality of user accounts may be determined to be in the active state based upon a determination of at least a single condition of the plurality of conditions. Alternatively and/or additionally, a user account of the second plurality of user accounts may be determined to be in the active state based upon a determination of two (e.g., or some other threshold number) or more of the plurality of conditions. Alternatively and/or additionally, a user account of the second plurality of user accounts may be determined to be in the active state based upon a determination of most of the plurality of conditions. Alternatively and/or additionally, a user account of the second plurality of user accounts may be determined to be in the active state based upon a determination of every condition of the plurality of conditions.

In some examples, it may be determined that the second plurality of user accounts are concurrently in the active state based upon determining that the second plurality of user accounts are in the active state within a period of time. For example, the period of time may be 1 minute, 15 minutes, 30 minutes, etc. For example, it may be determined that the second plurality of user accounts are in the active state within the period of time based upon a determination that the communication activity was performed using a second plurality of client devices associated with the second plurality of user accounts within the period of time.

At 458, responsive to detecting that the second plurality of user accounts are concurrently in the active state, a plurality of online communication interfaces associated with the second online communication platform may be presented. For example, a first graphical user interface of a second client device associated with a second user account of the second plurality of user accounts may be controlled to display a first online communication interface associated with the second online communication platform. Alternatively and/or additionally, a second graphical user interface of a third client device associated with a third user account of the second plurality of user accounts may be controlled to display a second online communication interface associated with the second online communication platform.

In some examples, the second online communication platform may be associated with a second messaging platform. For example, the second online communication platform may enable a second group of users, of the group of users, to perform communications by transmitting and/or receiving messages via the plurality of online communication interfaces. Alternatively and/or additionally, the second online communication platform may be associated with an online video communication service. For example, the second online communication platform may enable the second group of users to perform communications via a video call. For example, the plurality of online communication interfaces may display video representations received from devices associated with the second group of users.

Alternatively and/or additionally, the second online communication platform may be associated with an online audio communication service. For example, the second online communication platform may enable the second group of users to perform communications via an audio call. For example, the plurality of online communication interfaces may present audio representations (e.g., output audio using speakers) received from devices associated with the second group of users.

Alternatively and/or additionally, the second online communication platform may be associated with a VR communication service. For example, the second online communication platform may present a simulated environment comprising representations of the second group of users of the second plurality of user accounts. For example, each user of the second group of users may be represented by an avatar. Responsive to receiving an audio signal and/or a movement signal indicating movement of a user, audio associated with the audio signal may be outputted using speakers and/or an avatar associated with the user may be displayed as speaking words associated with the audio signal and/or may perform movements associated with the movement signal.

Alternatively and/or additionally, the second online communication platform may be associated with an MR communication service. For example, the second online communication platform may present holograms comprising representations of the second group of users. For example, the holograms may be generated based upon video signals received from the second plurality of client devices associated with the second plurality of user accounts. Alternatively and/or additionally, audio may be outputted based upon audio signals received from the second plurality of client devices.

In an example, the first online communication platform may comprise a gaming platform. For example, the gaming platform may comprise a gaming messaging interface for performing communications by transmitting messages to each other while gaming on the gaming platform. In some examples, the second online communication platform may comprise an online audio communication service. For example, the online audio communication service may be associated with the gaming platform. For example, the second online communication platform may enable the second group of users to perform communications via an audio call while using the gaming platform. For example, the plurality of online communication interfaces may output audio based upon audio signals received from client devices associated with the second group of users. Alternatively and/or additionally, the second online communication platform may comprise an online video communication service. For example, the online video communication service may be associated with the gaming platform. For example, the second online communication platform may enable the second group of users to perform communications via a video call while using the gaming platform. For example, the plurality of online communication interfaces may present video representations received from client devices associated with the second group of users.

FIGS. 5A-5H illustrate examples of a system 501 for displaying messaging interfaces based upon email conversations (e.g., and/or different types of conversations). A first user, such as user Sally, (and/or a first client device 500 associated with the user) may access and/or interact with an email service (and/or a different type of messaging service) for sending and receiving email messages (and/or different types of messages). A first user account (e.g., an email account) of the first user with the email service may be accessed and/or interacted with via one or more interfaces on the first client device 500, such as an email client, a browser, an application, etc. Accordingly, a graphical user interface of the first client device 500 may be controlled to display an email interface.

Figure 5A:
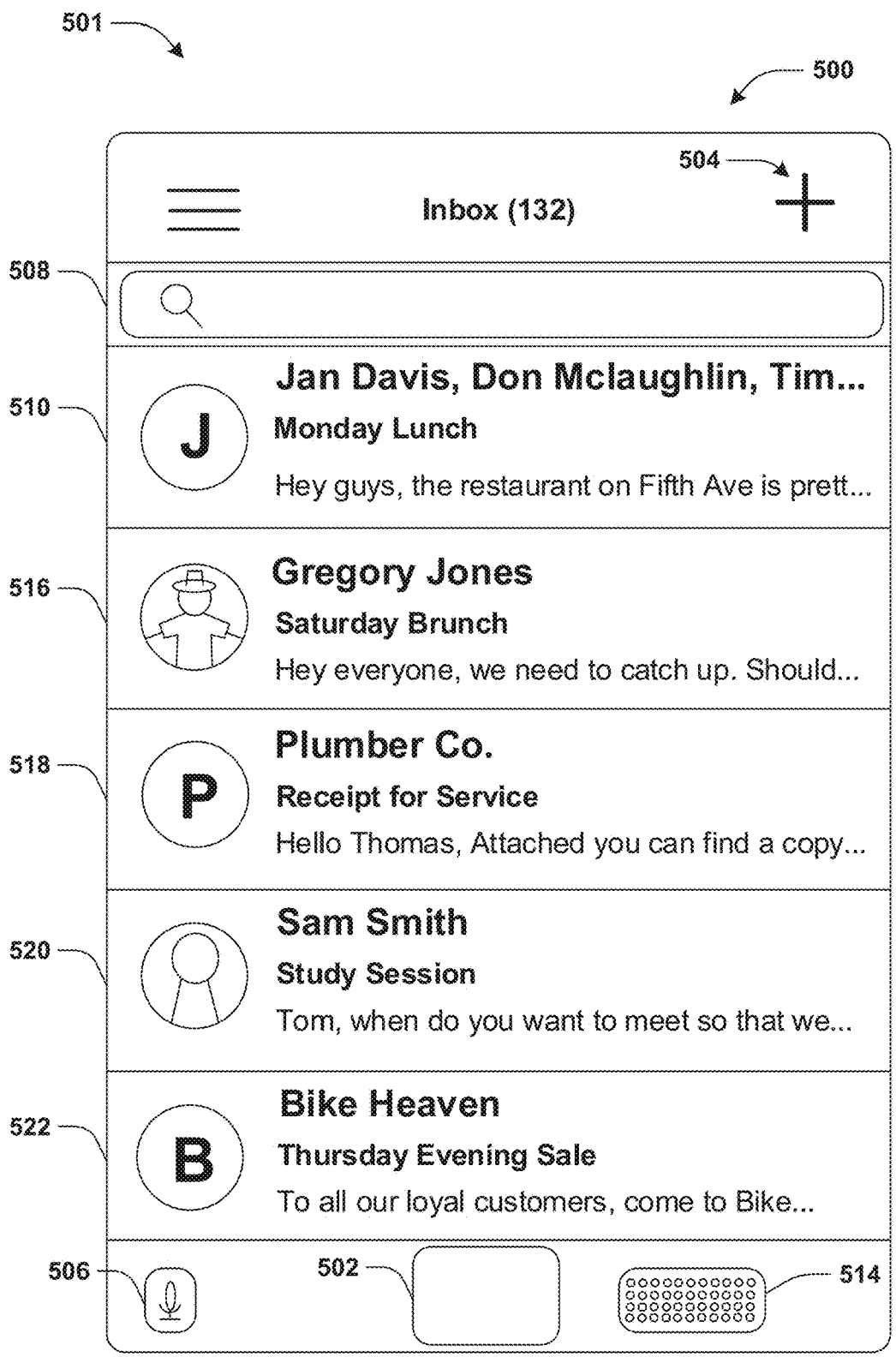
FIG. 5A is a component block diagram illustrating an example system for displaying messaging interfaces based upon email conversations, where a graphical user interface of a first client device is controlled to display an email interface.

FIG. 5A illustrates the graphical user interface of the first client device 500 being controlled to display the email interface. The first client device 500 may comprise a button 502, a microphone 506 and/or a speaker 514. In some examples, the email interface may comprise a search area 508 that may be used to search (for email messages, for user contacts, etc. of) the first user account. Alternatively and/or additionally, the email interface may comprise a first selectable input 504 corresponding to an option for composing a new email message. In some examples, responsive to (e.g., receiving) a selection of the first selectable input 504, the graphical user interface of the first client device 500 may be controlled to display an email composition interface.

The email interface may comprise a list of email messages received via the email service. For example, the list of email messages may comprise a first email message 510, a second email message 516, a third email message 518, a fourth email message 520 and/or a fifth email message 522. In some examples, the list of email messages may correspond to an inbox section associated with the email account, an "all emails" section associated with the email account, an "archived emails" section associated with the email account, etc. In some examples, responsive to receiving a selection of an email message of the list of email messages, the graphical user interface of the first client device 500 may be controlled to display the email message. For example, a selection of the first email message 510 may be received (e.g., via the first client device 500). Responsive to receiving the selection of the first email message 510, the graphical user interface may be controlled to display the first email message 510.

Figure 5B:
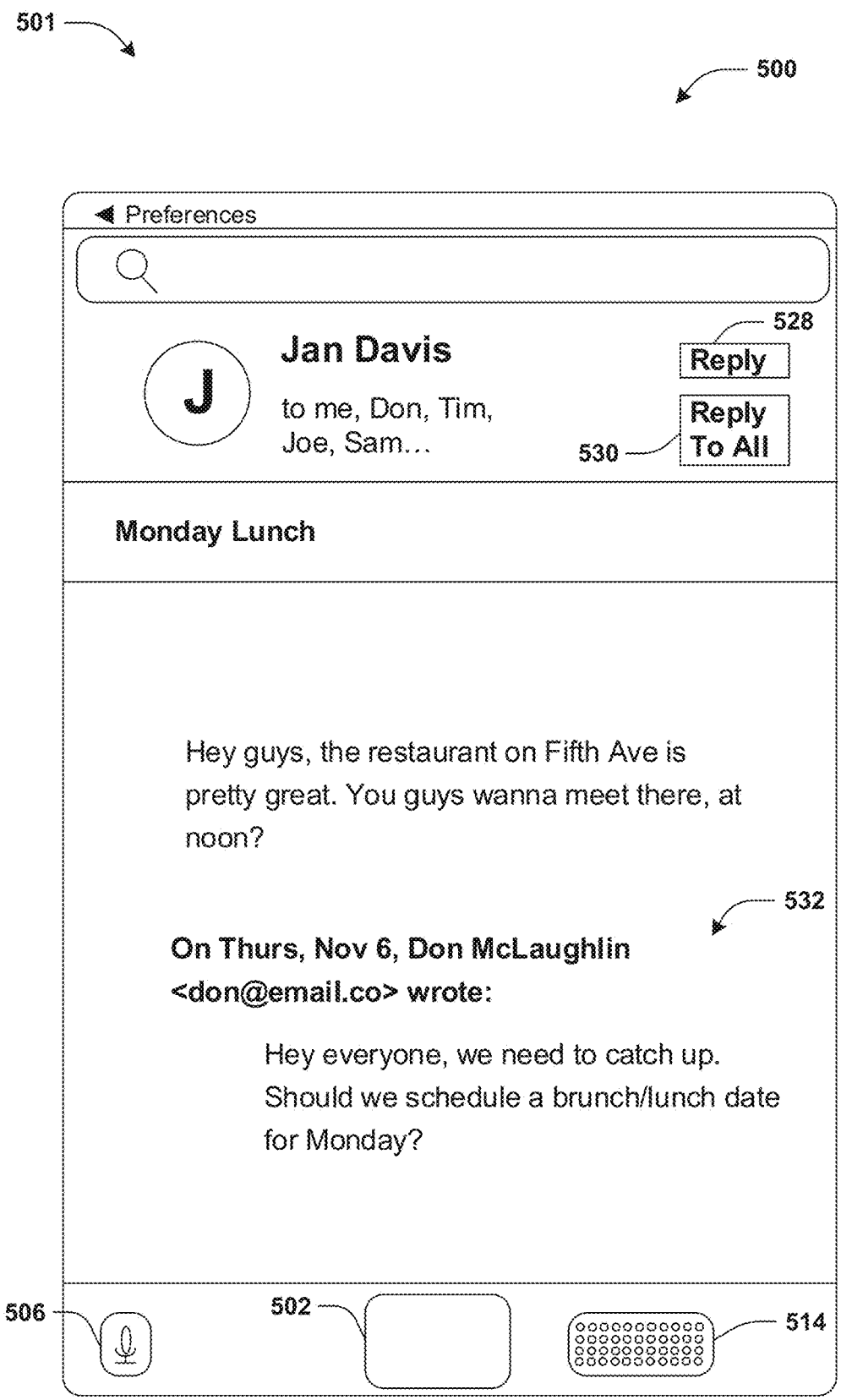
FIG. 5B is a component block diagram illustrating an example system for displaying messaging interfaces based upon email conversations, where a graphical user interface of a first client device is controlled to display a first email message.

FIG. 5B illustrates the graphical user interface of the first client device 500 being controlled to display the first email message 510. In some examples, the graphical user interface may be controlled to display a second selectable input 528 and/or a third selectable input 530. For example, the second selectable input 528 may correspond to an option for responding to (e.g., and/or replying to) a sender of the first email message 510. In some examples, the sender of the first email message 510 may correspond to a second user account associated with a first user identification "Jan Davis". Alternatively and/or additionally, the third selectable input 530 may correspond to an option for responding to (e.g., and/or replying to) the sender and one or more recipients (e.g., other than the first user) of the first email message 510.

In some examples, the first email message 510 may be associated with a first set of emails of an email conversation. For example, the email conversation and/or the first set of emails may be associated a plurality of user accounts, comprising the first user account and/or the second user account. For example, the first set of emails may comprise a sixth email message, transmitted by a third user account associated with a second user identification "Don McLaughlin". For example, the first email message 510 may comprise a representation 532 of the sixth email message.

Figure 5C:
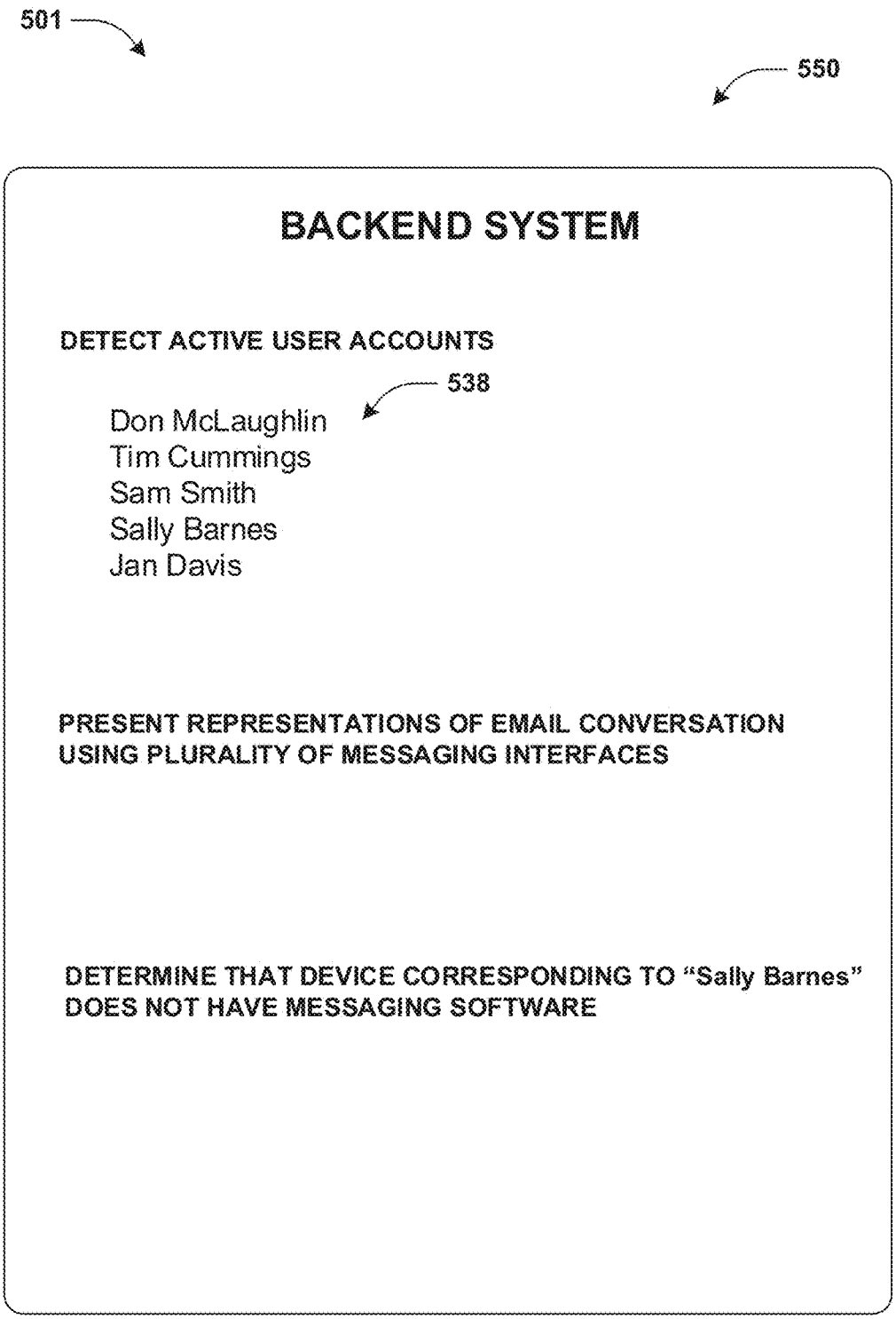
FIG. 5C is a component block diagram illustrating an example system for displaying messaging interfaces based upon email conversations, where a backend system determines that a second plurality of user accounts are in an active state.

FIG. 5C illustrates a backend system 550 of the system 501 determining that a second plurality of user accounts 538 are in an active state. For example, email activity associated with the plurality of user accounts may be monitored. In some examples, the second plurality of user accounts 538, of the plurality of user accounts, may be determined to be in the active state based upon the email activity. Responsive to determining that the second plurality of user accounts 538 are in the active state, representations of the email conversation may be presented using a plurality of messaging interfaces. In some examples, it may be determined that the first client device 500, corresponding to the first user account, does not have messaging software installed for enabling a messaging interface (to be used and/or displayed). For example, responsive to determining that the first client device 500 does not have the messaging software installed, a first notification may be transmitted to the first client device 500.

Figure 5D:
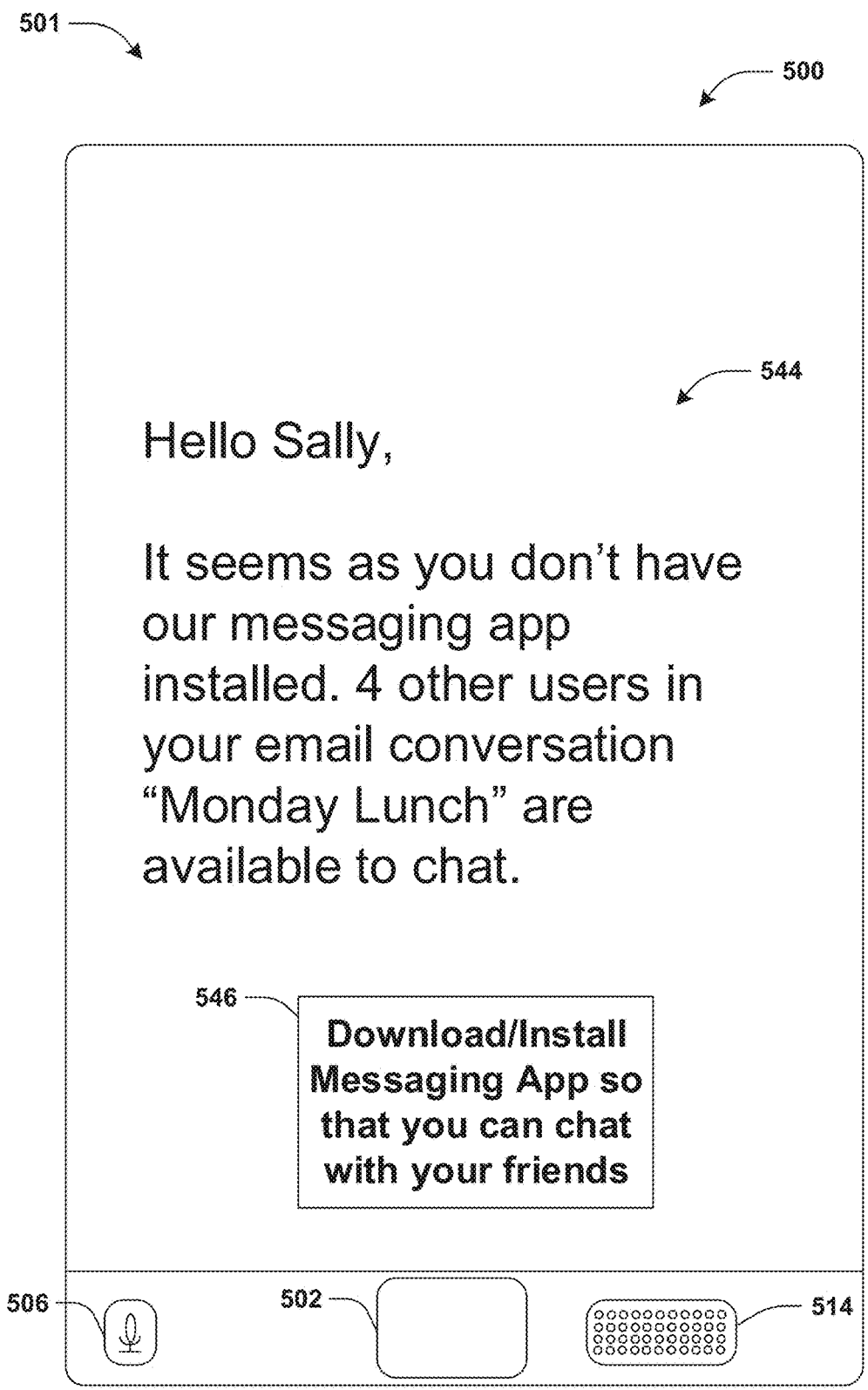
FIG. 5D is a component block diagram illustrating an example system for displaying messaging interfaces based upon email conversations, where a graphical user interface of a first client device is controlled to display a first notification.

FIG. 5D illustrates the graphical user interface of the first client device 500 being controlled to display the first notification. For example, the first notification may comprise a message 544 and/or a fourth selectable input 546. In some examples, the message 544 may comprise an indication of a number of user accounts of the second plurality of user accounts 538 that are in the active state. Alternatively and/or additionally, the fourth selectable input 546 may correspond to a request to download and/or install the messaging software. For example, responsive to a selection of the fourth selectable input 546, the request to download and/or install the messaging software may be received from the first client device 500. The messaging software may be transmitted to the first client device 500. For example, the messaging software may be downloaded to the first client device 500 and/or may be installed on the first client device 500.

Figure 5E:
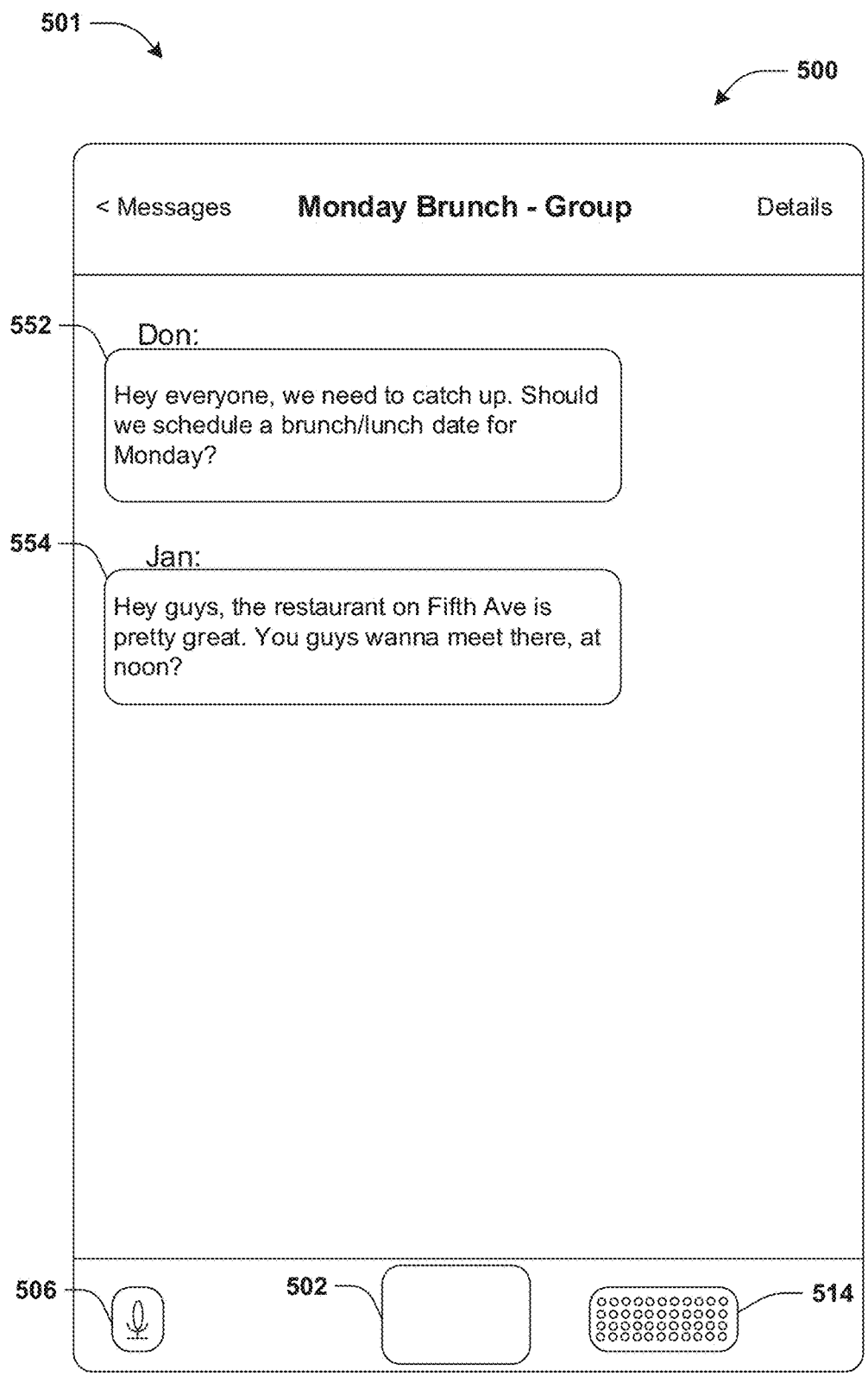
FIG. 5E is a component block diagram illustrating an example system for displaying messaging interfaces based upon email conversations, where a graphical user interface of a first client device is controlled to display a messaging interface comprising a representation of an email conversation.

FIG. 5E illustrates the graphical user interface of the first client device 500 being controlled to display a messaging interface comprising a representation of the email conversation. For example, the messaging interface may comprise a first message 552 corresponding to the second email message. Alternatively and/or additionally, the messaging interface may comprise an indication that the third user account transmitted the second email message. Alternatively and/or additionally, the messaging interface may comprise a second message 554 corresponding to the first email message 510. Alternatively and/or additionally, the messaging interface may comprise an indication that the second user account transmitted the first email message 510.

Figure 5F:
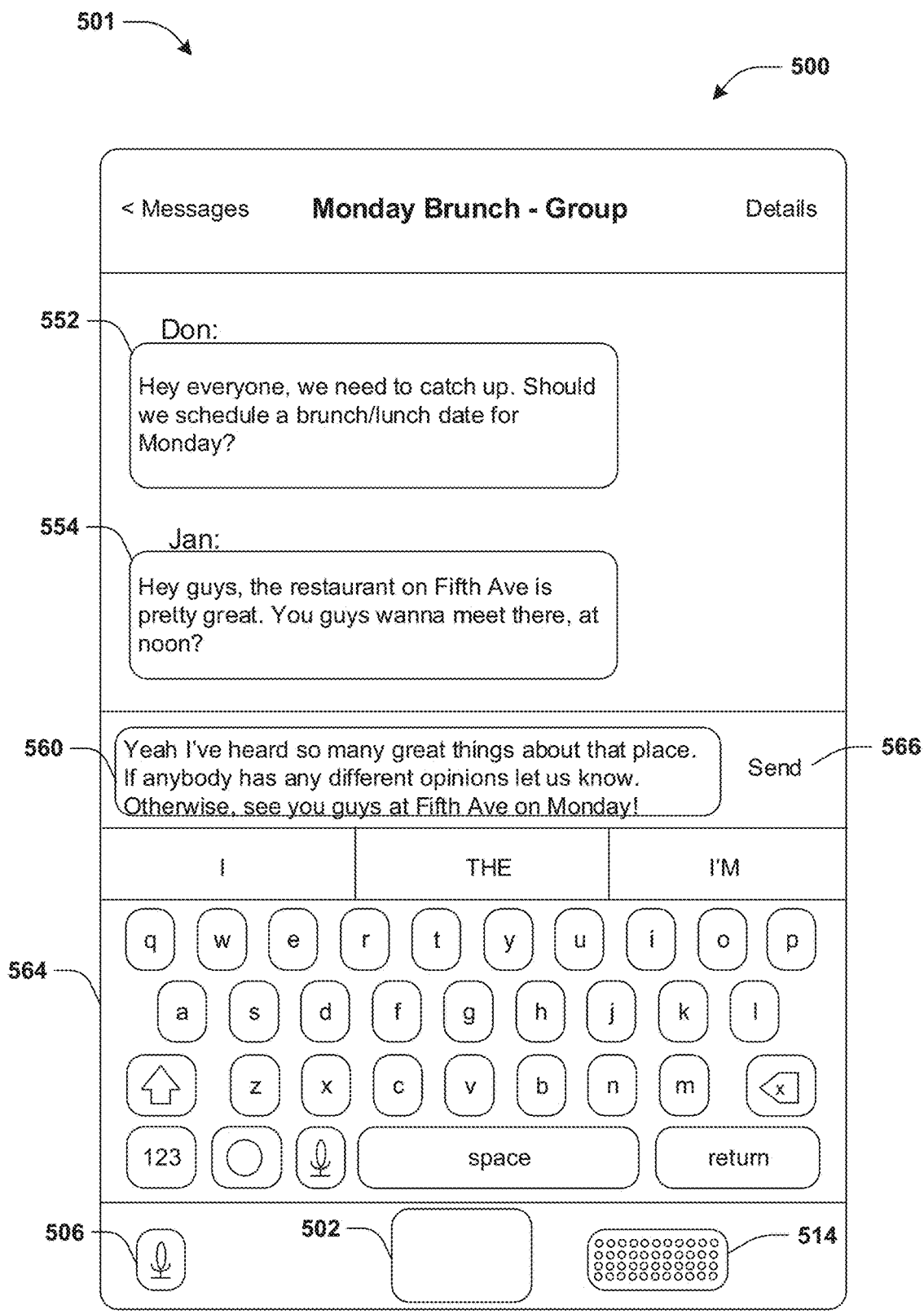
FIG. 5F is a component block diagram illustrating an example system for displaying messaging interfaces based upon email conversations, where a graphical user interface of a first client device is controlled to display a messaging interface.

FIG. 5F illustrates the graphical user interface of the first client device 500 being controlled to display the messaging interface. For example, the messaging interface may comprise a keypad 564, a textbox 560 and/or a fifth selectable input 566. For example, text may be entered into the textbox 560 using the keypad 564 and/or a conversational interface (e.g., a voice recognition and natural language interface) of the first client device 500. Alternatively and/or additionally, the fifth selectable input 566 may corresponding to transmitting a third message 570 (illustrated in FIG. 5G) comprising the text. In some examples, responsive to a selection of the fifth selectable input 566 the third message 570 may be received. Responsive to receiving the third message 570, a representation of the third message 570 may be displayed using the plurality of messaging interfaces (including the messaging interface).

Figure 5G:
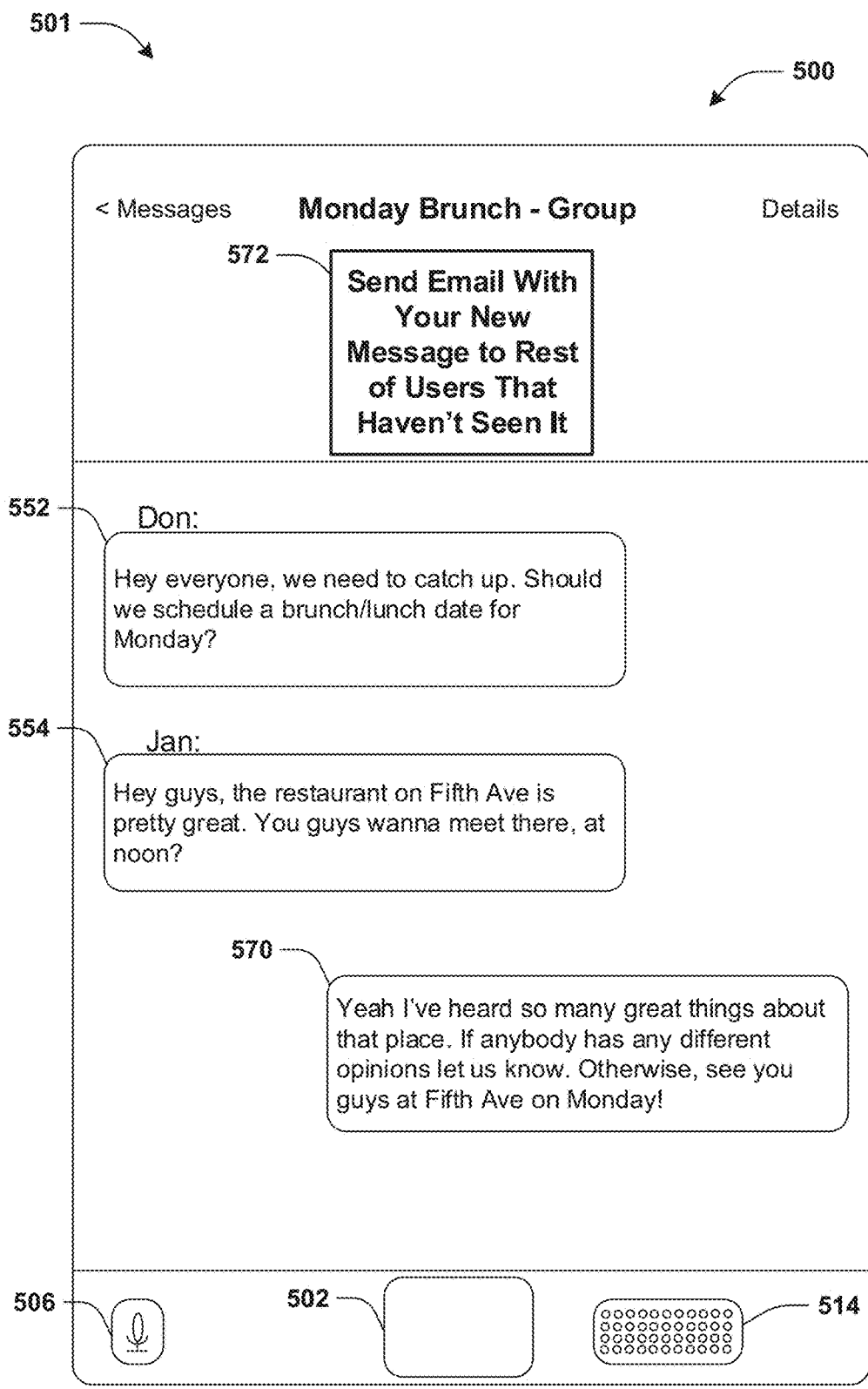
FIG. 5G is a component block diagram illustrating an example system for displaying messaging interfaces based upon email conversations, where a graphical user interface of a first client device is controlled to display a messaging interface comprising a representation of a third message.

FIG. 5G illustrates the graphical user interface of the first client device 500 being controlled to display the messaging interface comprising a representation of the third message 570. In some examples, responsive to receiving the third message 570, a fourth email message comprising a representation of the third message 570 may be automatically transmitted to the plurality of user accounts. Alternatively and/or additionally, the fourth email message may be transmitted to merely one or more user accounts, of the plurality of user accounts, that are not associated with the plurality of messaging interfaces. For example, the one or more user accounts may be associated with one or more client devices that are not used to present a messaging interface comprising a representation of the email conversation. Alternatively and/or additionally, the fourth email message may be transmitted to the one or more user accounts (and/or the plurality of user accounts) responsive to a selection of a sixth selectable input 572 corresponding to a request to transmit the fourth email message.

Figure 5H:
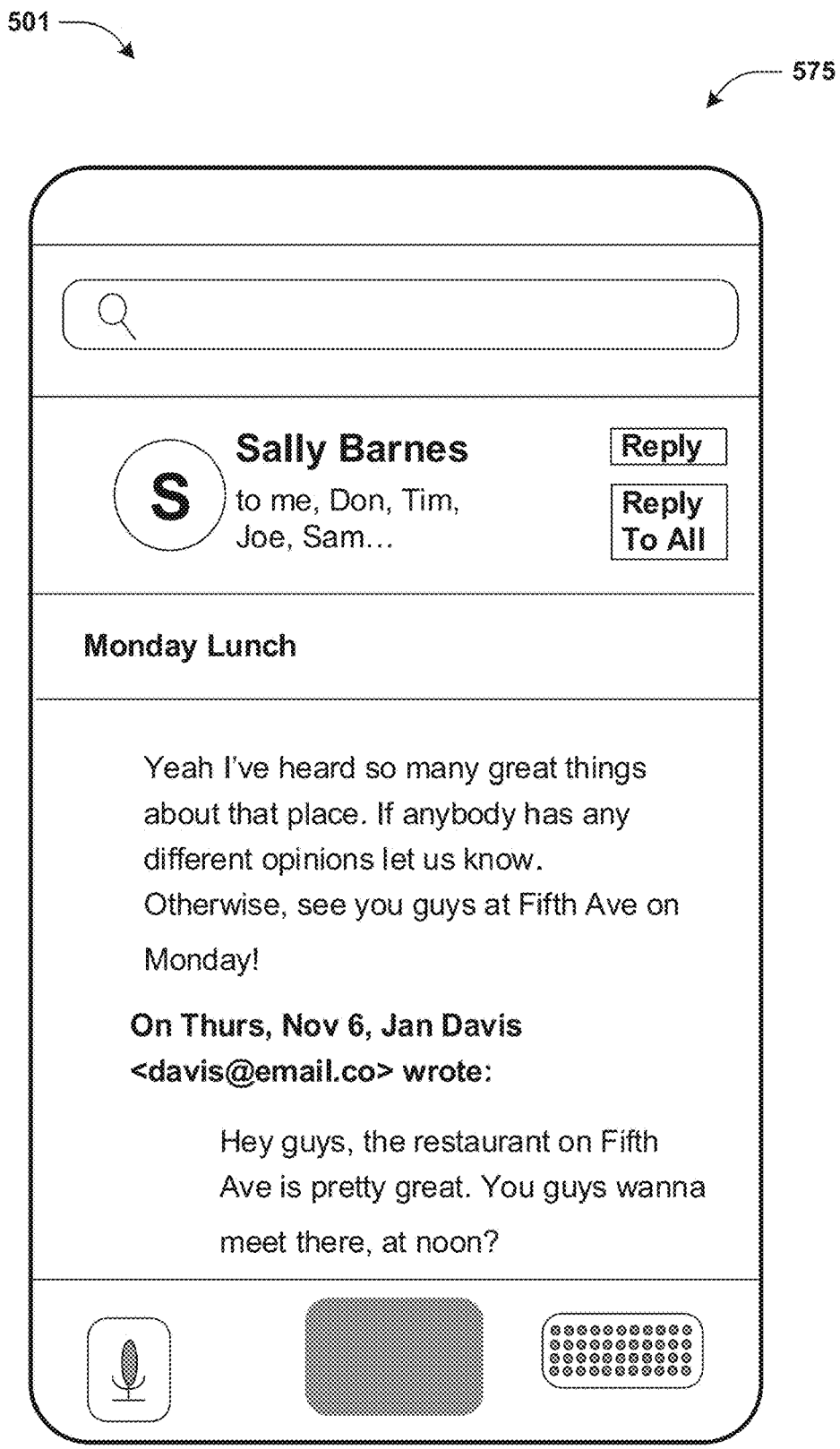
FIG. 5H is a component block diagram illustrating an example system for displaying messaging interfaces based upon email conversations, where a second graphical user interface of a second client device is controlled to display a fourth email message.

For example, a fourth user account, of the one or more user accounts, may receive the fourth email message. FIG. 5H illustrates a second graphical user interface of a second client device 575 being controlled to display the fourth email message. For example, the fourth email message may comprise the representation of the third message 570.

It may be appreciated that the disclosed subject matter may assist a user (e.g., and/or a client device associated with the user) in communicating with other users more quickly, more conveniently and/or in a more user friendly manner.

Implementation of at least some of the disclosed subject matter may lead to benefits including, but not limited to, a reduction in screen space and/or an improved usability of a display (e.g., of the client device) (e.g., as a result of enabling the user to automatically communicate with other users associated with an email conversation using a messaging interface without the user needing to manually open the messaging interface and add the other users to a messaging group, as a result of enabling the user to automatically communicate with other users associated with a first messaging conversation and/or the email conversation using an online audio communication service, an online video communication service, a VR communication service and/or an MR communication service, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
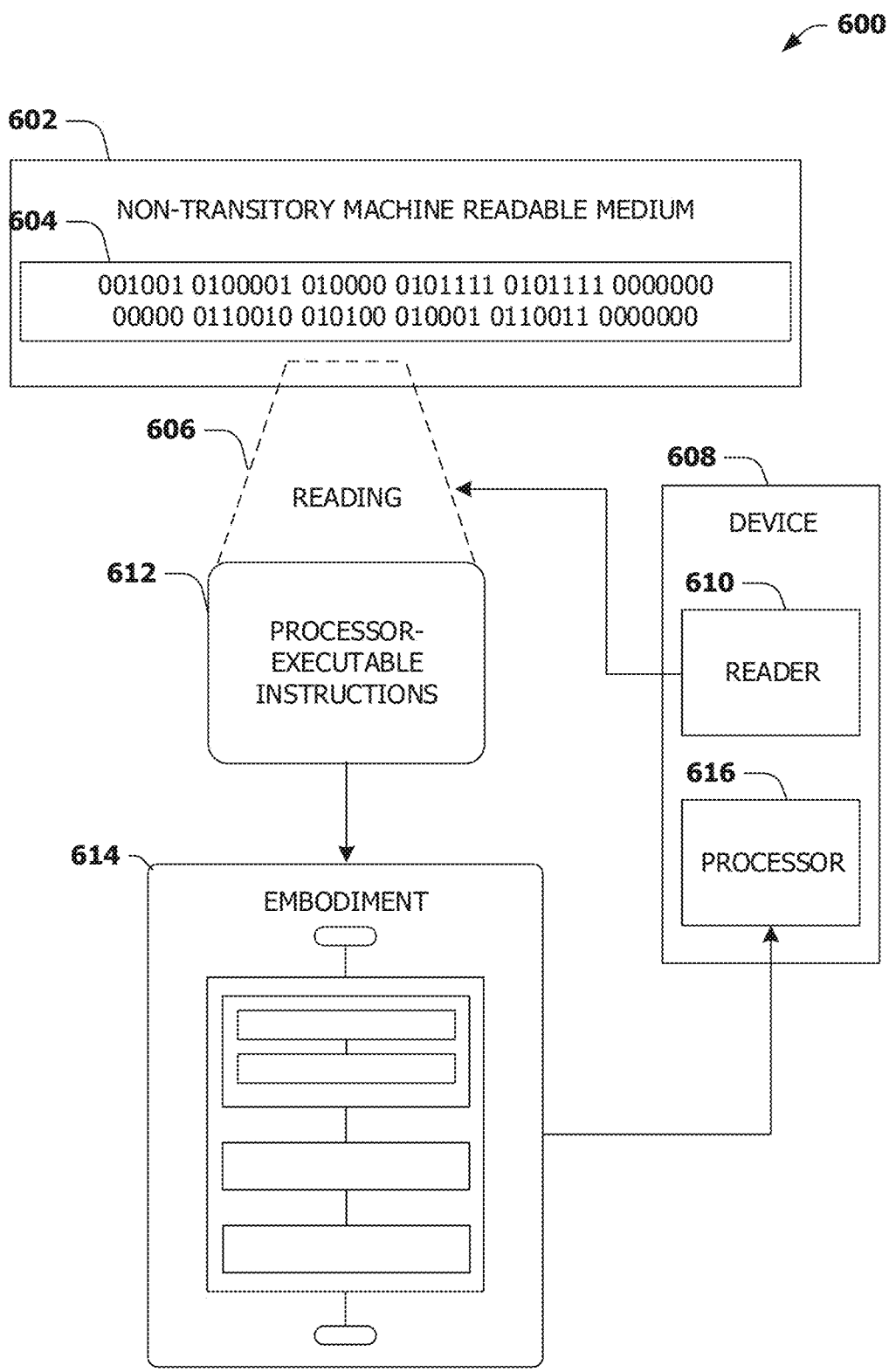
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4A, and/or the example method 450 of FIG. 4B, for example. In some embodiments, the processor-executable instructions 612 are configured to cause implementation of a system, such as at least some of the example system 501 of FIGS. 5A-5H, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   identifying an email conversation associated with a plurality of user accounts;
   monitoring email activity associated with the plurality of user accounts;
   detecting that a second plurality of user accounts of the plurality of user accounts are concurrently in an active state, based upon the email activity;
   transmitting one or more notifications to one or more devices associated with the second plurality of user accounts, wherein the one or more notifications are indicative of the second plurality of user accounts being in the active state;
   receiving a plurality of requests, via the one or more notifications, indicative of presenting the email conversation using at least one messaging interface; and
   responsive to detecting that the second plurality of user accounts are concurrently in the active state and determining that a number of requests of the plurality of requests is greater than a threshold number of requests:
      controlling a first graphical user interface of a first device associated with a first user account of the second plurality of user accounts to display a first messaging interface comprising a first representation of the email conversation; and
      controlling a second graphical user interface of a second device associated with a second user account of the second plurality of user accounts to display a second messaging interface comprising a second representation of the email conversation.

2. The method of claim 1, comprising:
   determining that a third device, associated with a third user account of the second plurality of user accounts, does not have messaging software installed for enabling a third messaging interface;
   transmitting a notification to the third device comprising an indication of the messaging software;
   receiving a request to download the messaging software via the notification;
   transmitting the messaging software to the third device; and
   controlling a third graphical user interface of the third device to display the third messaging interface comprising a third representation of the email conversation, using the messaging software.

3. The method of claim 1, wherein the detecting that the second plurality of user accounts are concurrently in the active state comprises detecting that the second plurality of user accounts are in the active state within a period of time.

4. The method of claim 1, wherein the detecting that the second plurality of user accounts are concurrently in the active state comprises detecting that an email interface is open on the one or more devices associated with the second plurality of user accounts.

5. The method of claim 1, wherein the detecting that the second plurality of user accounts are concurrently in the active state comprises detecting that one or more emails are received by the one or more devices associated with the second plurality of user accounts.

6. The method of claim 1, comprising:
   receiving one or more messages from one or more user accounts of the second plurality of user accounts via one or more messaging interfaces.

7. The method of claim 6, wherein:
   displaying representations of the one or more messages via a plurality of messaging interfaces.

8. The method of claim 1, wherein:
   the email activity is indicative of one or more user accounts of the plurality of user accounts being in an inactive state; and the second plurality of user accounts does not comprise the one or more user accounts.

9. The method of claim 7, comprising:
generating one or more emails based upon the one or more messages, wherein the one or more emails comprise content associated with the one or more messages; and
transmitting the one or more emails to the plurality of user accounts.

10. A computing device comprising:
a processor; and
memory comprising processor-executable instructions that when executed by the processor cause performance of operations, the operations comprising:
identifying a conversation, associated with a plurality of user accounts, on a first online communication platform;
monitoring communication activity associated with the plurality of user accounts;
detecting that a second plurality of user accounts of the plurality of user accounts are concurrently in an active state, based upon the communication activity;
transmitting one or more notifications to one or more devices associated with the second plurality of user accounts, wherein the one or more notifications are indicative of the second plurality of user accounts being in the active state;
receiving a plurality of requests, via the one or more notifications, indicative of presenting the conversation using at least one online communication interface associated with a second online communication platform; and
responsive to detecting that the second plurality of user accounts are concurrently in the active state and determining that a number of requests of the plurality of requests is greater than a threshold number of requests:
controlling a first graphical user interface of a first device associated with a first user account of the second plurality of user accounts to display a first online communication interface associated with the second online communication platform; and
controlling a second graphical user interface of a second device associated with a second user account of the second plurality of user accounts to display a second online communication interface associated with the second online communication platform.

11. The computing device of claim 10, wherein the detecting that the second plurality of user accounts are concurrently in the active state comprises detecting that the second plurality of user accounts are in the active state within a period of time.

12. The computing device of claim 10, wherein:
the first online communication platform is associated with an email service; and
the conversation is an email conversation.

13. The computing device of claim 10, wherein:
the first online communication platform is associated with a messaging platform; and
the conversation is a messaging conversation.

14. The computing device of claim 10, wherein:
the second online communication platform is associated with a video communication service; and
each of the first online communication interface and the second online communication interface displays video representations received from devices of a second plurality of devices.

15. The computing device of claim 10, wherein:
the second online communication platform is associated with an audio communication service; and
each of the first online communication interface and the second online communication interface presents audio representations received from devices of a second plurality of devices.

16. A non-transitory machine readable medium having stored thereon processor-executable instructions that when executed cause performance of operations, the operations comprising:
identifying an email conversation associated with a plurality of user accounts;
monitoring email activity associated with the plurality of user accounts;
detecting that a second plurality of user accounts of the plurality of user accounts are concurrently in an active state, based upon the email activity;
transmitting one or more notifications to one or more devices associated with the second plurality of user accounts, wherein the one or more notifications are indicative of the second plurality of user accounts being in the active state;
receiving a plurality of requests, via the one or more notifications, indicative of presenting the email conversation using at least one messaging interface;
responsive to detecting that the second plurality of user accounts are concurrently in the active state and determining that a number of requests of the plurality of requests is greater than a threshold number of requests, generating a messaging conversation based upon the email conversation, wherein the messaging conversation comprises content of the email conversation;
controlling a first graphical user interface of a first device associated with a first user account of the second plurality of user accounts to display a first messaging interface comprising a first representation of the messaging conversation; and
controlling a second graphical user interface of a second device associated with a second user account of the second plurality of user accounts to display a second messaging interface comprising a second representation of the messaging conversation.

17. The non-transitory machine readable medium of claim 16, the operations comprising:
determining that a third device, associated with a third user account of the second plurality of user accounts, does not have messaging software installed for enabling the messaging conversation to be displayed;
transmitting a notification to the third device comprising an indication of the messaging software;
receiving a request to download the messaging software via the notification;
transmitting the messaging software to the third device; and
controlling a third graphical user interface of the third device to display a third messaging interface comprising a third representation of the messaging conversation, using the messaging software.

18. The non-transitory machine readable medium of claim 16, wherein the detecting that the second plurality of user accounts are concurrently in the active state comprises detecting that the second plurality of user accounts are in the active state within a period of time.

19. The non-transitory machine readable medium of claim 16, wherein the detecting that the second plurality of user accounts are concurrently in the active state comprises detecting that an email interface is open on the one or more devices associated with the second plurality of user accounts.

20. The non-transitory machine readable medium of claim 16, wherein the detecting that the second plurality of user accounts are concurrently in the active state comprises detecting that one or more emails are received by the one or more devices associated with the second plurality of user accounts.

* * * * *